(12) United States Patent
Parisi

(10) Patent No.: US 6,907,253 B2
(45) Date of Patent: Jun. 14, 2005

(54) METHOD AND APPARATUS FOR HIGH DENSITY MESSAGE CODING

(75) Inventor: Mark Parisi, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 646 days.

(21) Appl. No.: 09/803,058

(22) Filed: Mar. 8, 2001

(65) Prior Publication Data

US 2003/0050013 A1 Mar. 13, 2003

(51) Int. Cl.[7] .................................................. H04B 1/38
(52) U.S. Cl. ................................... 455/456.3; 340/7.53
(58) Field of Search ........................... 455/456.2, 456.3, 455/517, 414.1; 340/7.53

(56) References Cited

U.S. PATENT DOCUMENTS

| | | | |
|---|---|---|---|
| 6,144,859 A | 11/2000 | LaDue | |
| 6,208,878 B1 * | 3/2001 | Hattori et al. | 455/566 |
| 6,337,972 B1 * | 1/2002 | Jones et al. | 340/7.57 |
| 2002/0077750 A1 * | 6/2002 | McDonald et al. | 701/213 |

OTHER PUBLICATIONS

Saggie, Meir C.; Published on the world wide web, "Bits and Bytes"; May 12, 996.

* cited by examiner

*Primary Examiner*—Vivian Chin
*Assistant Examiner*—Sanh Phu
(74) *Attorney, Agent, or Firm*—Philip R. Wadsworth; Charles D. Brown; Thomas M. Thibault

(57) ABSTRACT

A remote reporting unit, such as freight trailer monitoring device, generates a number of different status messages representing conditions such as door open, latitude, longitude, battery condition, and the like. The remote unit combines the status messages into an optimized output. Optimization is implemented by applying a predetermined mapping scheme to convert the status message's values into a consolidated output. Having optimized the message, the remote unit transmits the consolidated output in the form of a "feature code" such as a code prefixed by star (*) or another conventional prefix. Telephony equipment that receives the feature code via the cellular telephone network interprets the feature codes by reversing the re-mapping process.

7 Claims, 3 Drawing Sheets

US 6,907,253 B2

METHOD AND APPARATUS FOR HIGH DENSITY MESSAGE CODING

BACKGROUND OF THE INVENTION

I. Field of the Invention

The present invention relates to the use of feature codes in telephony. More particularly, the invention concerns a method of generating, exchanging, and interpreting feature codes that are compressed by re-mapping their contents.

II. Description of the Related Art

A typical wireless telecommunications network includes a large number of remote switching centers, spread across a broad geographic area. Whenever a remote subscriber places a call, a nearby remote switching center receives the wireless signal for processing. As a remote subscriber moves between different geographic locations, different remote switching centers may receive the wireless signal and process the subscriber's call.

As a matter of convenience to remote subscribers, many wireless telecommunications companies permit remote subscribers to dial a telephone number using a special dialing string or "SDS". A simplified dialog string is a shortened or abbreviated dialing string, often beginning with a symbol such as the star key (*) or pound key (#) and typically containing three digits (e.g., *123). When a remote subscriber dials a simplified dialing string, a remote switching center receives the simplified dialing string and then translates the received simplified dialing string into a number to be dialed (e.g., *123 may be translated to 555-1234).

Similarly, many wireless telecommunications companies also support the use of remote feature codes ("feature codes"). A feature code is similar to a simplified dialing string, but is used as an instruction to control service features from a remote subscriber's handset. A non-exhaustive list of such features includes Call Forwarding, Call Waiting, Calling Number Identification, Automatic Callback, Conference Calling, Message Waiting Notification, Call Encryption, Selective Call Acceptance, Voice Mail, Enhanced Vocoder, and Cost of Call Notification. Activation or deactivation of such features typically involves the completion of a sequence of keystrokes on the keypad for selecting or de-selecting the desired feature. In many cases, the keystrokes involve the entry of a numeric sequence preceded by the star key (*) and/or followed by the pound key (#). An exemplary feature code, for example, might be *66#. Sometimes, feature codes are invoked by the user's selection of a dedicated menu by pressing a "Menu" key followed by a one- or two-digit number, one or more soft keys, or by scrolling the menu screen. Even when a remote unit has menu capability, the feature code value specific to the home network is commonly a numeric sequence as above, with selection of the "Menu" key being sent as a star key to indicate a feature code. In this case, the feature code value is programmed upon activation of the feature to correspond to a particular menu location, and the actual feature code value is unknown to the user.

In a typical wireless telecommunications system, translation of simplified dialing strings and feature codes occurs within the remote switching center processing the remote subscriber's call. Thus, for example, when a remote subscriber in one geographic location dials *123, a remote switching center in that same location performs the required translation. In contrast, when the same remote subscriber is in a different geographic location and dials the same string/code (e.g., *123), a different remote switching center will likely process the call.

Because each remote switching center independently translates strings/codes into dialed numbers, it is possible that the same strings/codes will be translated into a different number to be dialed depending upon which remote switching center performs the translation. For example, if a subscriber in one geographic location, such as Texas, dials *123, the Dallas remote switching center may translate the call to dialed number 458-1440. Whereas, if a remote subscriber in another geographic location, such as Washington, D.C., the Washington D.C. remote switching center may translate the call to a different dial number such as 555-1212. For the same reason, it is also possible that different remote switching centers will activate/de-activate different service features in response to the same feature code processed by the different remote switching centers.

The use of feature codes have been developed and expanded in a variety of different implementations. Some examples appear in the following references:

1. U.S. Pat. No. 6,122,501 dated Sep. 19, 2000, entitled "System and Method for Flexible Translation of Wireless Special Dialing Strings and Remote Feature Codes."
2. U.S. Pat. No. 6,141,545 dated Oct. 31, 2000, entitled "Method and System for Remote Call Forwarding of Telephone Calls from Cellular Phone."
3. U.S. Pat. No. 6,029,065, dated Feb. 22, 2000, for "Remote Feature Code Programming for Remote Stations."
4. U.S. Pat. No. 5,913,165, dated Jun. 15, 1999, for "Method for Changing Subscriber Service Features in a Radio Telecommunications Network."

A different use of feature codes has been the recruitment of existing cellular telephone networks to transmit encoded data related to telemetry tracking, surveillance, data transmission, identification, and remote monitoring. One such application involves the exchange of automated status messages between cargo trucks and a central monitoring facility by equipping the cargo trucks with cellular telephone equipment, and transmitting the messages via "feature codes." To avoid the varying significance of feature codes from one cellular service provider to another, remote switching centers typically return calls with feature codes to the subscriber's home service area, which can implement the feature code as intended by the subscriber. Thus, by equipping a cargo truck's cellular telephone with a Mobile Identification Number (MIN) that indicates that the telephone's home service provider is the central cargo monitoring facility, and programming the remote switching centers to forward all feature codes from phones belonging to that home service provider to the central cargo monitoring facility, the existing cellular network is recruited to direct messages from field equipment to the central monitoring site. One reference that addresses this subject is U.S. Pat. No. 6,144,859 dated Nov. 7, 2000, for "Wireless Cellular Communicator System and Apparatus."

Although these systems constitute a significant advance and enjoy substantial commercial success today, engineers at Qualcomm Incorporated continually endeavor to improve the performance and efficiency of such remote communications systems. With Qualcomm's OmniTRACS® product line, for example, Qualcomm engineers are interested in increasing the speed and efficiency of data flow between remote cargo units and the central monitoring facility.

SUMMARY OF THE INVENTION

Broadly, the present invention concerns the use of feature codes in telephony, and more particularly, a method of generating, exchanging, and interpreting feature codes that are compressed by re-mapping their contents. A remote reporting unit, such as freight trailer monitoring device, automatically generates one or more status messages representing conditions such as door open, latitude, longitude, battery condition, and the like. The remote unit combines the status messages into an optimized output. Optimization is implemented by applying a predetermined mapping scheme to convert the status message's numeric values into a consolidated output.

Although this mapping may be implemented with a mapping guide such as a table, a more efficient implementation utilizes an appropriate mathematical formula to combine the status messages. For example, the consolidated output may be calculated by adding the product of each status message with a different coefficient. One example involves adding one status message, plus another status message multiplied by a first coefficient, plus another status message multiplied by a second coefficient times the first coefficient, etc. The coefficients are selected such that consolidated output can be decomposed into the constituent status messages by performing series of division operations, with the remainders and the final result providing constituent messages.

Having optimized the message, the remote unit transmits the compressed code in the form of a feature code such as the consolidated code prefixed by star (*) or another combination widely practiced in telephony. After the cellular telephony network routes the feature code according to a target processing facility according to known routing principles, the target processing facility interprets the feature codes by reversing the re-mapping process.

The foregoing features may be implemented in a number of different forms. For example, the invention may be implemented to provide a method of combining one or more status messages into a consolidated output and transmitting the consolidated output from a remote unit via a cellular telephone network. In another embodiment, the invention may be implemented to provide an apparatus such as a remote reporting unit, programmed to combine one or more status messages into a consolidated output and transmit the consolidated output over a cellular telephone network. In still another embodiment, the invention may be implemented to provide a signal-bearing medium tangibly embodying a program of machine-readable instructions executable by a digital data processing apparatus to perform optimization and transmission operations as described above. Another embodiment concerns logic circuitry having multiple interconnected electrically conductive elements configured to perform optimization and transmission operations as described above.

The invention affords its users with a number of distinct advantages. Chiefly, the optimization aspect of the invention permits remote units to convey more information in the same number of messages or use fewer messages to convey the same information, thus conserving valuable bandwidth. By its compression, the invention achieves particular benefit for use in cellar telephony systems that limit features codes to a maximum length. Also, by transmitting the status messages in the form of a feature code, the invention benefits from existing infrastructure that is already configured to receive, route, and process feature codes. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections
Hardware Environment

Figure 1:
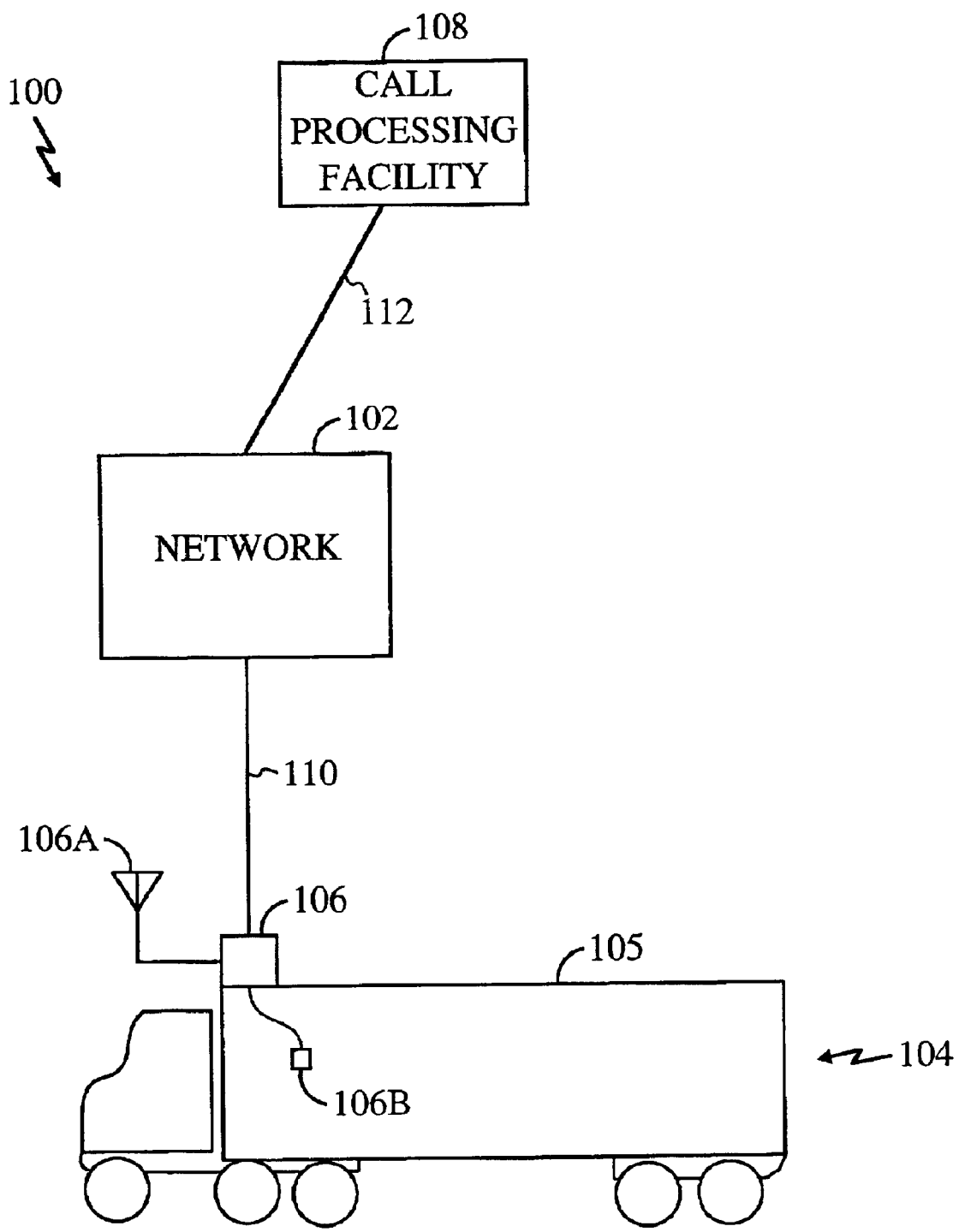
FIG. 1 is a block diagram of the hardware components and interconnections of the hardware environment of the invention.

FIG. 1 depicts an exemplary hardware environment 100 for use of the present invention. A remote reporting unit 106 prepares various status messages concerning the status of some equipment being monitored by the unit 106. The remote reporting unit 106 comprises an electronic unit with some computing capability, and may be implemented in various forms as discussed below. In the illustrated example, the remote reporting unit 106 is installed at a freight trailer 105 of a truck 104, although freight trailers are merely one example, as the remote reporting unit 106 may be implemented to monitor other equipment, such as other remote assets, including passenger automobiles, watercraft, aircraft, and railcars. In addition, the remote reporting unit 106 could alternatively be used to report the events or status of fixed remote assets, such as remote electronic meter readers.

The remote reporting unit 106 includes one or more sensors 106b to monitor events or conditions of the freight trailer 105 such as: door open/close event, cargo events, latitude, longitude, battery condition, tampering with the remote unit 106, software version, etc. The sensors 106b may comprise sensors as utilized in the commercially available OmniTRACS® system of Qualcomm Incorporated. Some exemplary types of sensors 106b include global positioning system (GPS) units, door ajar sensors, battery voltage/current sensors, timers, cargo volume sensors, motion detectors, etc.

The remote reporting unit 106 also includes a cellular telephony transceiver 106a, for exchanging messages via a wireless telephony network 102 with a call processing facility 108. As an example, the transceiver 106a may comprise equipment as found in the TrailerTRACS® product of Qualcomm Incorporated, which is a trailer position and status unit for sending trailer-related information to a call processing facility 108. When the remote unit 106 initiates a call, it is coupled to the network 102 by a wireless connection 110. The network 102 completes the call by forming another connection 112 (wireless or otherwise) coupling the call processing facility 108 to the network 102. The call processing facility 108 includes computing equipment to receive, interpret, and otherwise process incoming calls from remote reporting units 106.

Although other approaches may be used, the environment 100 may avoid the costs of subscribing to comprehensive voice cellular service by utilizing a network 102 with specialized facilities for conducting brief, non-voice transmissions. One example is the MICROBURST technology utility of AERIS.NET, INC. of San Jose, Calif. The MICROBURST technology utility is a commercially available product for sending short data packets over the control channels of existing cellular networks, and provides an economical conduit between the cellular telephone infrastructure and low-packet volume wireless data applications. For the MICROBURST utility, AERIS.NET, INC. contracts with cellular companies and then coordinates distribution channels, such as service providers with vertical market expertise, to take advantage of an evolving nationwide, virtual network. AERIS, INC. maintains and operates the virtual network and a nationwide MICROBURST hub, which acts as the network intelligence.

According to this invention, facilities of the call processing facility 108 include computing equipment to receive, interpret, and act upon messages transmitted by the remote reporting unit 106.

Exemplary Digital Data Processing Apparatus

As mentioned above, the remote reporting unit 106 may be implemented in various forms. As one example, the remote reporting unit 106 may comprise a digital data processing apparatus, as exemplified by the hardware components and interconnections of the digital data processing apparatus 200 of FIG. 2.

The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store various parameters, readings, messages, alpha-numeric sequences, and any other data generated by processor 202, sensors 106b, or received over the air by remote reporting device 106. The nonvolatile storage 208 may comprise, for example, one or more magnetic data storage disks such as a "hard drive", a tape drive, or any other suitable storage device for program instructions executed by the processor 202. The apparatus 200 also includes an input/output 210, such as a line, bus, cable, electromagnetic link, or other means for the processor 202 to exchange data with other hardware external to the apparatus 200, such as one or more sensors 106b.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement the remote reporting unit 106. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

Having described the structural features of the present invention, the method aspect of the present invention will now be described. As mentioned above, the method aspect of the invention generally involves a method of generating, exchanging, and interpreting feature codes that are compressed by re-mapping their contents. Although the present invention has broad applicability to machine-readable status messages, the specifics of the structure that has been described is particularly suited for sensing conditions of a freight tractor trailer, and the explanation that follows will emphasize such an application of the invention without any intended limitation.

Signal-Bearing Media

Figure 2:
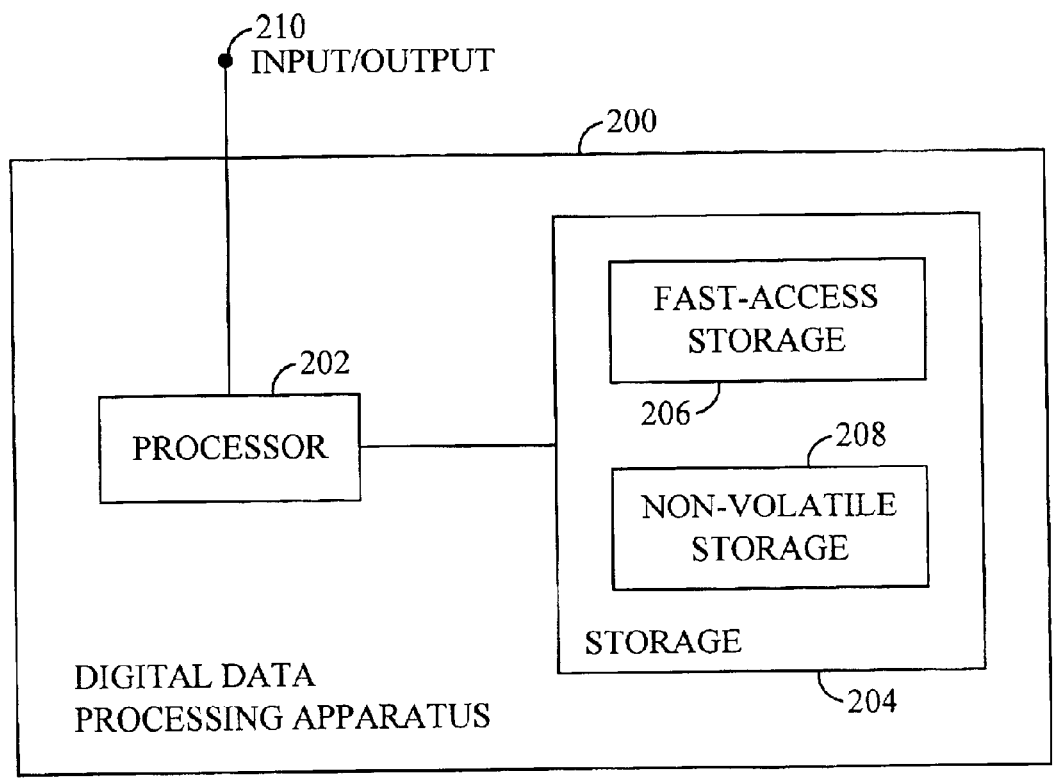
FIG. 2 is a block diagram of a digital data processing machine according to the invention.

In the context of FIGS. 1–2, such a method may be implemented, for example, by operating the remote reporting unit 106, as embodied by a digital data processing apparatus 200, to execute a sequence of machine-readable instructions. These instructions may reside in various types of signal-bearing media. In this respect, one aspect of the present invention concerns signal-bearing media embodying a program of machine-readable instructions executable by a digital data processor to generate and transmit feature codes that are optimized by re-mapping a number of constituent status messages. Another aspect of the invention is a program that is executable by the facilities of the call processing facility 108 to receive and interpret such feature codes.

Figure 3:
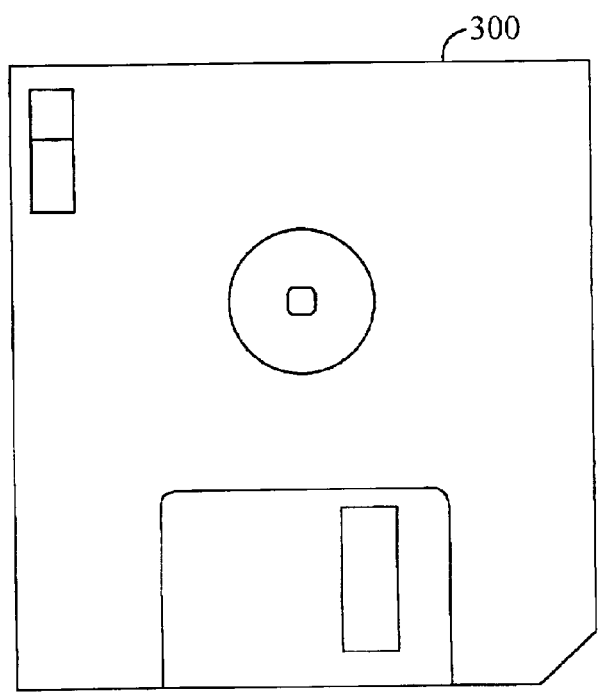
FIG. 3 shows an exemplary signal-bearing medium according to the invention.

In either case, such a signal-bearing media may comprise, for example, RAM (not shown) contained within the remote reporting unit 106 or call processing facility 108 (FIG. 1), as represented by the fast-access storage 206 (FIG. 2). Alternatively, the instructions may be contained in another signal-bearing media, such as a magnetic data storage diskette 300 (FIG. 3), directly or indirectly accessible by the processor 202. Whether contained in the storage 306, diskette 300, or elsewhere, the instructions may be stored on a variety of machine-readable data storage media. Some examples include as direct access storage (e.g., a conventional "hard drive", redundant array of inexpensive disks ("RAID"), or another direct access storage device ("DASD")), serial-access storage such as magnetic or optical tape, electronic read-only memory (e.g., ROM, EPROM, or EEPROM), optical storage (e.g., CD-ROM, WORM, DVD, digital optical tape), paper "punch" cards, or other suitable signal-bearing media including analog or digital transmission media and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in one or both of the remote reporting unit 106 and processing facility 108, and is configured to perform operations to implement the method of the invention. The logic circuitry may be implemented using many different types of circuitry, as discussed above.

Overall Sequence of Operation

Figure 4:
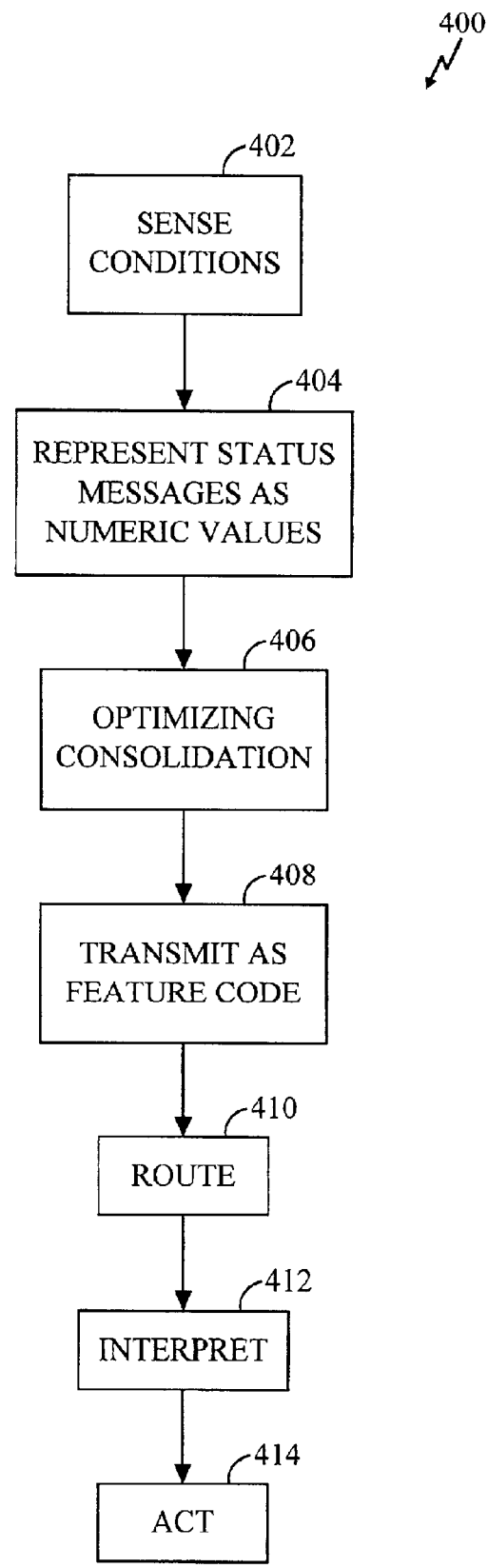
FIG. 4 is a flowchart of an operating sequence for preparing, transmitting, and interpreting optimized feature codes according to the invention.

FIG. 4 shows a sequence 400 to illustrate one example of the method aspect of the present invention. For ease of explanation, but without any intended limitation, the example of FIG. 4 is described in the context of the environment 100 described above. The steps begin in step 402, when the remote reporting unit 106 senses various conditions pertinent to the trailer 105. TABLE 1, below, shows an exemplary list of these conditions.

TABLE 1

Exemplary Conditions Sensed by Remote Reporting Unit

| CONDITION | POSSIBLE VALUES |
|---|---|
| latitude | range: 0–299,999 |
| longitude | range: 0–529,999 |
| trailer door state | open, closed |
| cargo state | empty, not empty, unknown |
| door event occurred | yes, no |
| freight event occurred | yes, no |
| cargo event occurred | yes, no |
| beginning of motion event occurred | yes, no |
| end of motion event occurred | yes, no |
| no event occurred | n/a |

The foregoing merely constitutes one example. Other conditions may also be reported, such as battery condition, e.g., new battery, full charge, needs charge, end of battery capacity, end of battery life, etc. The "door event" could be a sensed change in the door status, for example, the door changing state from "open" to "closed". The "cargo event" could be a sensed change in the cargo status, for example, an empty trailer being loaded with cargo. The "freight event" could be defined as a the door status combined with a time duration, i.e., a freight event could be defined as the door opening for at least a predetermined time period, then closing.

After step 402, the remote reporting unit 106 represents the sensed conditions as various status messages (step 404). Namely, each status message is reported as a numeric value representing one of multiple alternative conditions detected by the remote reporting unit. One example is shown in TABLE 2, below.

TABLE 2

Exemplary Conditions and Their Status Messages

| STATUS MESSAGE & FORMAT | REPRESENTS: |
|---|---|
| LAT | 0–299,999 in application-specific units of latitude |
| LON | 0–529,999 in application-specific units of longitude |
| STATE | 0 = cargo empty, door closed |
| | 1 = cargo empty, door open |
| | 2 = cargo not empty, door closed |
| | 3 = cargo not empty, door open |
| | 4 = cargo state unknown, door closed |
| | 5 = cargo state unknown, door open |
| EVENTS | 0 = no event occurred (ie, report position) |
| | 1 = event 1 occurred |
| | 2 = event 2 occurred |
| | 3 = event 1 and 2 occurred |
| | 4 = event 3 occurred |
| | 5 = event 3 and event 1 occurred |
| | 6 = event 3 and 2 occurred |
| | 7 = events 3, 2, and 1 occurred |
| | 8 = event 4 occurred |
| | 9 = event 4 and 1 occurred |
| | 10 = event 4 and 2 occurred |
| | 11 = event 4, 2, and 1 occurred |
| | 12 = event 4 and 3 occurred |
| | 13 = event 4, 3, and 1 occurred |
| | 14 = event 4, 3, and 2 occurred |
| | 15 = event 4, 3, 2, and 1 occurred |
| EVENTS | 16 = event 5 occurred |
| | 17 = event 5 and 1 occurred |
| | 18 = event 5 and 2 occurred |
| | 19 = event 5, 2, and 1 occurred |
| | 20 = event 5 and 3 occurred |
| | 21 = event 5, 3, and 1 occurred |
| | 22 = event 5, 3, and 2 occurred |
| | 23 = event 5, 3, 2, and 1 occurred |
| | 24 = coverage query |
| | 25 = battery needs replacement-day 1 |
| | 26 = battery needs replacement-day 2 |
| | 27 = battery needs replacement-day 3 |
| | 28 = battery was replaced 1 day ago |
| | 29 = battery was replaced 2 days ago |
| | 30 = battery was replaced 3 days ago |

The following is a possible condition of truck 104 and/or trailer 105 as reported to remote reporting unit 106 during typical use and is used as an illustrative example throughout the remainder of the present disclosure: LAT=118,620, LON=418,656, STATE=3, EVENT=18. These values indicate that the truck 104 and/or trailer 105 is at a latitude of 11 hours, 86 minutes, 20 seconds, a longitude of 41 hours 86 minutes, 56 seconds, having at least some cargo present (i.e., not empty), having a door open, and the battery has been in need of replacement for 1 day. Of course, the number and type of events may be different, depending on the application.

Events 1, 2, 3, 4, and 5 in Table 2 represent different operating events of the apparatus being monitored by remote reporting unit 106. In one embodiment, event 1 could represent a change in status of a door, event 2 could represent a change of status of cargo present, and event 3 could represent a change of status of the motion of truck 104 and/or trailer 105.

Event 24 is listed as a "coverage query". This event may occur for example, when a vehicle attempts to transmit information for the first time at while located in a new geographic area. For example, a trailer may comprise a remote reporting unit 106 which has not transmitted a message in quite some time. Subsequent to transmitting the prior message, the trailer was hooked up to a tractor vehicle and transported 1000 miles. The remote reporting unit 106 may not know whether it can communicate with a local wireless communication system, such as an analog cellular system. Therefore, prior to sending information over a local cellular system, the remote reporting unit 106 may transmit a message to determine whether it is capable of communicating with the local cellular system. Such a message is referred to as a coverage query. If a coverage is in doubt, a message is transmitted by remote reporting unit 106 having an event code of 24. Typically, if remote reporting unit 106 is within a coverage area, the local cellular system will transmit an acknowledgement message to remote reporting unit 106 indicating that remote reporting unit 106 is indeed within coverage and that the message information was received successfully. Such an arrangement allows one message containing the coverage query and pertinent operating information to be transmitted, rather than two messages, one to determine coverage and another to transmit operating information.

The arrangement of events shown in TABLE 2 may be tailored to the application for minimizing the number of messages needed for transmission. For example, it may be advantageous to group a number of events which have a high likelihood of occurrence together, as shown in events 1 through 23. In this example, the occurrence of multiple events generates only one message. For example, upon loading a trailer 105 with cargo, the door might change state (event 1) from open to closed and a cargo sensor might sense a change in cargo state (event 2) from empty to not empty. Only one message needs to be transmitted in this case: a message containing event code 3. In another example, the coverage query, event 24, could be grouped with the other 5 predefined events so that the current status of the apparatus being monitored could be transmitted in the same message as the coverage query. In other words, instead of sending one message having event code 24 (coverage query), then another message having event code 15, for example, Table 2 could be arranged such that the coverage query represents a $6^{th}$ event. TABLE 3 represents how the event representation would look.

TABLE 3

| EVENTS | |
|---|---|
| | 0 = 0 = no event occurred (ie, report position) |
| | 1 = event 1 occurred |
| | 2 = event 2 occurred |
| | 3 = events 1 and 2 occurred |
| | 4 = event 3 occurred |
| | 5 = events 3 and 1 occurred |
| | 6 = events 3 and 2 occurred |
| | 7 = events 3, 2, and 1 occurred |
| | 8 = event 4 occurred |
| | 9 = events 4 and 1 occurred |
| | 10 = events 4 and 2 occurred |
| | 11 = events 4, 2, and 1 occurred |
| | 12 = events 4 and 3 occurred |
| | 13 = events 4, 3, and 1 occurred |
| | 14 = events 4, 3, and 2 occurred |
| | 15 = events 4, 3, 2, and 1 occurred |
| | 16 = event 5 occurred |
| | 17 = events 5 and 1 occurred |
| | 18 = events 5 and 2 occurred |
| | 19 = events 5, 2, and 1 occurred |
| | 20 = event 5 and 3 occurred |
| | 21 = events 5, 3, and 1 occurred |
| | 22 = events 5, 3, and 2 occurred |
| | 23 = events 5, 3, 2, and 1 occurred |
| | 24 = event 6 occurred |
| | 25 = events 6 and 1 occurred |
| | 26 = events 6 and 2 occurred |
| | 27 = events 6, 2, and 1 occurred |
| | 28 = etc . . . |

As one can see, the total number of events would increase due to the inclusion of a coverage query as event 6. However, the number of messages transmitted might be reduced significantly in such an arrangement. By grouping those events most likely to occur together, the need for multiple message transmissions is reduced.

After step 404, the remote reporting unit 106 proceeds to step 406, where it optimizes the status messages. Step 404 is achieved by applying a predetermined mapping scheme to convert the status message's numeric values into a consolidated output.

In one embodiment, this mapping scheme may be implemented with a mapping guide such as a table, as shown in TABLE 4.

TABLE 4

Mapping Guide: Consolidated Outputs vs. Constituent Status Messages

| CONSOLIDATED (OPTIMIZED) OUTPUT | CONSTITUENT STATUS MESSAGES | | | |
|---|---|---|---|---|
| | LAT | LON | STATE | EVENT |
| 0 | 0 | 0 | 0 | 0 |
| 1 | 0 | 0 | 0 | 1 |

TABLE 4-continued

Mapping Guide: Consolidated Outputs vs. Constituent Status Messages

| CONSOLIDATED (OPTIMIZED) OUTPUT | CONSTITUENT STATUS MESSAGES | | | |
|---|---|---|---|---|
| | LAT | LON | STATE | EVENT |
| 2 | 0 | 0 | 0 | 2 |
| 3 | 0 | 0 | 0 | 3 |
| . . . | . . . | . . . | . . . | . . . |
| 30 | 0 | 0 | 0 | 30 |
| 31 | 0 | 0 | 1 | 0 |
| 32 | 0 | 0 | 1 | 1 |
| . . . | . . . | . . . | . . . | . . . |

The complete contents of TABLE 4 requires a considerable length to present all possible combinations of latitude, longitude, state, and event conditions. A more efficient implementation omits the lengthy mapping guide and instead utilizes an appropriate mathematical formula to combine the status messages, and a reverse mathematical formula to de-construct the status messages. Such a formula may be a variation of known string packing techniques such as Radix–50, for example. For example, the consolidated output may be calculated by adding one status message, plus another status message multiplied by a first coefficient, plus another status message multiplied by a second coefficient times the first coefficient, etc. As explained in greater detail below, the coefficients are selected such that consolidated output can be decomposed into the constituent status messages by performing series of division operations, with the remainders and the final result providing constituent messages.

EQUATION 1, below, provides a specific example of one mathematical formula that may be utilized to consolidate the status messages shown above.

$$CNO = C3*LAT + C2*LON + C1*STATE + EVENT \qquad [1]$$

where:

CNO=the consolidated output.

C1=a first coefficient, equal to the number of possible values that the EVENT variable can occupy, in the present example, 31.

C2=a second coefficient, equal to the number of possible values that the STATE variable can occupy multiplied by the number of possible values that the EVENT variable can occupy, in the present example equal to 6*31=186.

C3=a third coefficient, equal to the number of possible values that the LON variable can occupy multiplied by the number of possible values that the STATE variable can occupy multiplied by the number of possible values that the EVENT variable can occupy, in the present example equal to 530,000*6*31=98,580,000.

LAT=content of the LAT status message.

LON=content of the LON status message.

EVENT=content of the EVENT status message.

STATE=content of the STATE status message.

Therefore, the consolidated output in the present example would be equal to:

(98,580,000*118,620)+(186*418,656)+(31*3)+18=11,693,559,600,000+77,870,016+93+18=11,693,637,470,127

After step 406, the remote reporting unit 106 generates a feature code comprising of the consolidated output, and transmits the feature code to the call processing facility 108 via the network 102 (step 408). The consolidated output may be transmitted as a feature code, for example, by initiating a cellular telephone call containing the output preceded by star(*).

In summary, the encoding process can be described generically as follows, using Table 4.

TABLE 4

| Condition | Number Of Possible Values |
|---|---|
| A | W |
| B | X |
| C | Y |
| D | Z |

Table 4 shows conditions A, B, C, and D, corresponding to various conditions present at freight trailer 105, truck 104, or other vehicle or device being monitored by remote reporting unit 106. In the present example, condition A represents latitude, condition B represents longitude, condition C represents State and condition D represents Event. Each monitoring situation may have the same, or greater or fewer conditions to be monitored. Each of the conditions in Table 4 has a corresponding number of possible values. For example, in the present example, the number of possible values of the State condition is 6. To encode the actual values of the conditions, where the order of the conditions is predetermined, then the following equation may be used (assuming an order of A, B, C, and D, i.e. A being "most significant position" and D being "least significant position"):

$$CNO = (W*X*Y)*A + (W*X)*B + (W)*C + D$$

After the feature code is transmitted in step 408, the network 102 routes the feature code to the call processing facility 108 (step 410). As one example, to avoid the varying significance of feature codes from one cellular service provider to another, the network 102 may route calls with return feature codes to the subscriber's home service area, which can implement the feature code as intended by the subscriber. By equipping the remote reporting unit 106 with a unique mobile identificaiton number (MIN) prefix identifying central monitoring site 108, such as "175", and programming the remote switching centers to direct all feature code calls having a MIN prefix equal to "175" to the call processing facility 108, the existing cellular network can be used to direct messages from field equipment (106) to a central monitoring site (108).

In step 412, the call processing facility 108 interprets the feature code from the remote reporting unit 106. This is performed by utilizing the mapping guide (TABLE 3) in reverse. Or more expeditiously, step 412 may apply a reverse of the formula that was used to prepare the consolidated output. In the example of EQUATION 1, the consolidated output is de-composed as shown by EQUATIONS 2–4, below.

$$CNO/\text{NUMBER OF POSSIBLE VALUES OF EVENTS} \longrightarrow \text{yields a QUOTIENT1, REMAINDER1 (REMAINDER1} = EVENT) \quad [2]$$

$$\text{QUOTIENT 1/NUMBER OF POSSIBLE VALUES OF STATE} \longrightarrow \text{yields a QUOTIENT2, REMAINDER2 (REMAINDER2} = STATE) \quad [3]$$

$$\text{QUOTIENT2/NUMBER OF POSSIBLE VALUES OF } LON \longrightarrow \text{yields a QUOTIENT3, REMAINDER3 (REMAINDER3} = LON; \text{QUOTIENT3} = LAT) \quad [4]$$

Alternatively, the consolidated output is de-composed as shown by EQUATIONS 5–7, below.

$$CNO/C3 \longrightarrow \text{yields a QUOTIENT1, REMAINDER1 (QUOTIENT1} = LAT) \quad [5]$$

$$\text{REMAINDER 1}/C2 \longrightarrow \text{yields a QUOTIENT2, REMAINDER2 (QUOTIENT2} = LON) \quad [6]$$

$$\text{REMAINDER2}/C1 \longrightarrow \text{yields a QUOTIENT3, REMAINDER3 (REMAINDER3} = STATE; \text{QUOTIENT3} = EVENT) \quad [7]$$

Generically, the decoding process can be described as follows (referring back to Table 4).

$$CNO/Z \longrightarrow \text{yields a QUOTIENT1, REMAINDER1 (REMAINDER1} = D)$$

$$\text{QUOTIENT 1}/Y \longrightarrow \text{yields a QUOTIENT2, REMAINDER2 (REMAINDER2} = C)$$

$$\text{QUOTIENT2}/X \longrightarrow \text{yields a QUOTIENT3, REMAINDER3 (REMAINDER3} = B; \text{QUOTIENT3} = A)$$

The decoding process may alternately be expressed as:

$$CNO/(W*X*Y) \longrightarrow \text{yields a QUOTIENT1, REMAINDER1 (QUOTIENT1} = A)$$

$$\text{REMAINDER 1}/(W*X) \longrightarrow \text{yields a QUOTIENT2, REMAINDER2 (QUOTIENT2} = B)$$

$$\text{REMAINDER2}/W \longrightarrow \text{yields a QUOTIENT3, REMAINDER3 (REMAINDER3} = C; \text{QUOTIENT3} = D)$$

Finally, in step 414, the call processing facility 108 acts upon feature code that was interpreted in step 412. These actions may involve recording the constituent status messages, sending return messages, transmitting notification of the status messages to an interested party (such as an operator of the trucking line that owns the trailer 105), alerting technical support staff to an urgent condition at the trailer 105, etc.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for transmitting data from a remote reporting unit via a wireless communication network, comprising operations of:

generating a status message, said status message having a value representing one of multiple alternative conditions detected by a remote unit;

applying a predetermined mapping scheme to convert said value into a consolidated output;

generating a feature code comprising the consolidated output; and transmitting the feature code to a call processing facility.

2. The method of claim 1, where the operation of applying a predetermined mapping scheme comprises:

multiplying each status message by a different predetermined coefficient to create a corresponding multiplicative product; and adding the multiplicative products;

wherein the coefficients are selected to enable reconstruction of each status message by repeated division of the consolidated output by the coefficients.

3. The method of claim 1, wherein said status message comprises a latitude, a longitude, an event code representing an occurrence of one or more predetermined events, and a state code representing one or more states.

4. The method of claim 3, where the operation of applying a predetermined mapping scheme comprises:

multiplying the latitude status message by a first coefficient;

multiplying the longitude status message by a second coefficient;

multiplying the event code by a third coefficient; and adding results of the foregoing multiplication operations to the state to create a corresponding multiplicative product.

5. A signal-bearing medium tangibly embodying a program of machine-readable instructions executable by a digital processing apparatus to perform operations for transmitting data from a remote unit via a telephone network, said operations comprising:

a remote reporting unit for generating a status message, said status message having a value representing one of multiple alternative conditions detected by the remote reporting unit;

the remote unit optimizing the status message comprising operations of:

applying a predetermined mapping scheme to convert said value into a consolidated output; and the remote unit generating a feature code comprising the consolidated output, and transmitting the feature code to a call processing facility.

6. The medium of claim 5, wherein the operation of the remote unit applying a predetermined mapping scheme comprises:

multiplying each status message by a different predetermined coefficient to create a corresponding multiplicative product; and adding the multiplicative products;

where the coefficients are selected to enable reconstruction of the status messages by repeated division of the consolidated output by the coefficients.

7. A remote reporting unit, comprising:

a first sensor for sensing an first event and generating a first status;

a second sensor for sensing a second event and generating a second status;

a wireless transmitter;

data processing circuitry, coupled to said first sensor, second sensor, and said transmitter, configured to transmit reports of the events and status by performing operations comprising:

generating a status message, said status message having a value representing one of multiple alternative conditions detected by the first and second sensors;

optimizing the status message by applying a predetermined mapping scheme to the status message to convert the value into a consolidated output;

generating a feature code comprising the consolidated output; and transmitting the feature code to a call processing facility using said wireless transmitter.

* * * * *